US012590405B2

(12) United States Patent
Yoon et al.

(10) Patent No.: US 12,590,405 B2
(45) Date of Patent: Mar. 31, 2026

(54) SYSTEM AND METHOD FOR MONITORING A REDUCED STATIC FEATURE IN A LAUNDRY TREATMENT APPLIANCE

(71) Applicant: Haier US Appliance Solutions, Inc., Wilmington, DE (US)

(72) Inventors: Je Kwon Yoon, Hwaseong (KR); Dale Pleasant Pepoon, Taylorsville, KY (US); Jason Fuchs, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 762 days.

(21) Appl. No.: 17/959,650

(22) Filed: Oct. 4, 2022

(65) Prior Publication Data

US 2024/0110329 A1 Apr. 4, 2024

(51) Int. Cl.
| | |
|---|---|
| D06F 58/44 | (2020.01) |
| D06F 34/18 | (2020.01) |
| D06F 34/26 | (2020.01) |
| D06F 58/02 | (2006.01) |
| D06F 58/20 | (2006.01) |
| D06F 58/38 | (2020.01) |
| D06F 101/02 | (2020.01) |
| D06F 103/08 | (2020.01) |
| D06F 103/34 | (2020.01) |

(Continued)

(52) U.S. Cl.
CPC .............. D06F 58/44 (2020.02); D06F 34/18 (2020.02); D06F 34/26 (2020.02); D06F 58/02 (2013.01); D06F 58/203 (2013.01); D06F 58/38 (2020.02); G01N 27/02

(2013.01); *D06F 2101/02* (2020.02); *D06F 2103/08* (2020.02); *D06F 2103/34* (2020.02); *D06F 2105/12* (2020.02)

(58) Field of Classification Search
CPC ........ D06F 58/44; D06F 58/02; D06F 58/203; D06F 34/18; D06F 58/38; D06F 34/26; D06F 2103/08; D06F 2103/34; D06F 2105/12; D06F 2101/02; G01N 27/02
USPC ........................................... 34/318, 595–610
See application file for complete search history.

(56) References Cited

U.S. PATENT DOCUMENTS

| | | | | | |
|---|---|---|---|---|---|
| 6,092,301 A | * | 7/2000 | Komanowsky | ......... | F26B 5/048 34/265 |
| 7,146,749 B2 | * | 12/2006 | Barron | .................. | D06F 58/203 34/601 |

(Continued)

FOREIGN PATENT DOCUMENTS

| | | | | |
|---|---|---|---|---|
| CN | 101210375 B | | 9/2011 | |
| CN | 113756073 A | * | 12/2021 | ............. D06F 58/45 |

(Continued)

*Primary Examiner* — Stephen M Gravini
(74) *Attorney, Agent, or Firm* — Dority & Manning, P.A.

(57) ABSTRACT

A method of operating a laundry treatment appliance including a chamber for receiving a laundry load and a water supply provided within the chamber includes determining a target moisture level of the laundry load; initiating a drying cycle of the laundry load, the drying cycle including a primary drying time; initiating a spray operation for providing moisture into the chamber; determining that a measured moisture level of the laundry load meets a moisture goal based on the target moisture level; and ceasing the spray operation in response to determining that the measured moisture level meets the moisture goal.

16 Claims, 5 Drawing Sheets

(51) Int. Cl.
    *D06F 105/12*       (2020.01)
    *G01N 27/02*       (2006.01)

(56)            References Cited

U.S. PATENT DOCUMENTS

| | | | |
|---|---|---|---|
| 7,882,647 B2 * | 2/2011 | Ikemizu | D06F 58/203 |
| | | | 34/524 |
| 8,187,387 B2 * | 5/2012 | Kim | D06F 58/45 |
| | | | 34/443 |
| 9,551,105 B2 * | 1/2017 | Bae | D06F 58/44 |
| 9,689,109 B2 * | 6/2017 | Lyu | D06F 73/02 |
| 9,702,074 B2 | 7/2017 | Alexander et al. | |
| 9,731,865 B2 * | 8/2017 | Heβ | D06F 58/20 |
| 11,028,527 B2 * | 6/2021 | Vaive | D06F 58/26 |
| 11,519,128 B2 * | 12/2022 | Miranda Razo | D06F 58/203 |
| 11,859,341 B2 * | 1/2024 | Lee | D06F 39/40 |
| 12,012,689 B2 * | 6/2024 | Oak | D06F 58/24 |
| 12,043,950 B2 * | 7/2024 | Yoon | D06F 58/24 |
| 2021/0246602 A1 | 8/2021 | Miranda Razo | |
| 2024/0110329 A1 * | 4/2024 | Yoon | D06F 58/38 |

FOREIGN PATENT DOCUMENTS

| | | | | | |
|---|---|---|---|---|---|
| EP | 3919669 A4 * | 12/2021 | | | |
| ES | 2378233 T3 * | 4/2012 | | | F26B 3/30 |
| JP | 2008506091 A * | 2/2008 | | | F26B 3/30 |
| JP | 2019097624 A | 6/2019 | | | |
| KR | 20140101089 A | 8/2014 | | | |

\* cited by examiner

300

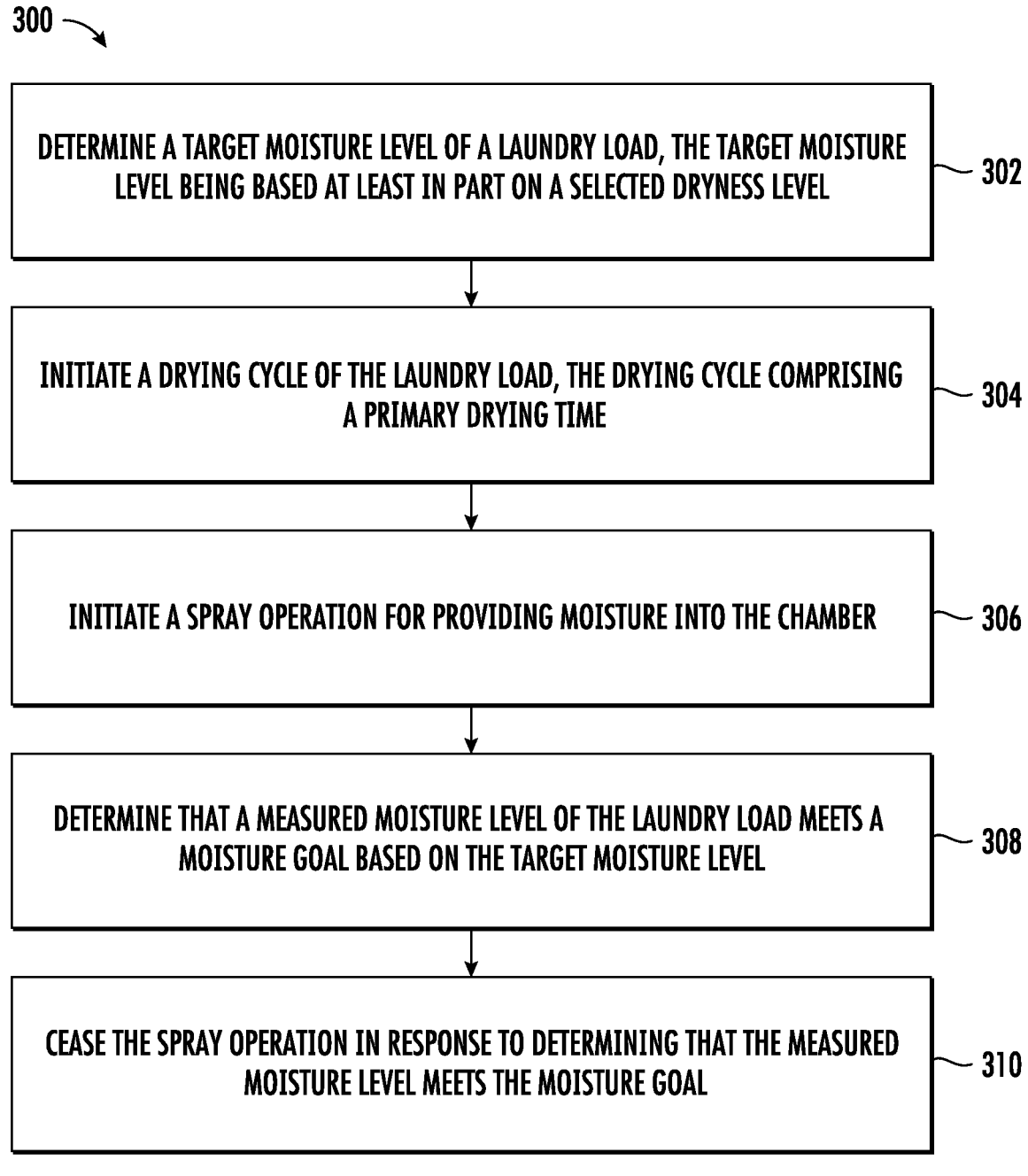

DETERMINE A TARGET MOISTURE LEVEL OF A LAUNDRY LOAD, THE TARGET MOISTURE LEVEL BEING BASED AT LEAST IN PART ON A SELECTED DRYNESS LEVEL ~ 302

INITIATE A DRYING CYCLE OF THE LAUNDRY LOAD, THE DRYING CYCLE COMPRISING A PRIMARY DRYING TIME ~ 304

INITIATE A SPRAY OPERATION FOR PROVIDING MOISTURE INTO THE CHAMBER ~ 306

DETERMINE THAT A MEASURED MOISTURE LEVEL OF THE LAUNDRY LOAD MEETS A MOISTURE GOAL BASED ON THE TARGET MOISTURE LEVEL ~ 308

CEASE THE SPRAY OPERATION IN RESPONSE TO DETERMINING THAT THE MEASURED MOISTURE LEVEL MEETS THE MOISTURE GOAL ~ 310

FIG. 4

SYSTEM AND METHOD FOR MONITORING A REDUCED STATIC FEATURE IN A LAUNDRY TREATMENT APPLIANCE

FIELD OF THE INVENTION

The present subject matter relates generally to laundry treatment appliances, and more particularly to monitoring the performance of a reduced static feature within a laundry treatment appliance.

BACKGROUND OF THE INVENTION

Laundry treatment appliances (such as dryer appliances) generally include a cabinet with a drum rotatably mounted therein. During operation, a motor rotates the drum, e.g., to tumble articles located within a chamber defined by the drum. Dryer appliances also generally include a heater assembly that passes heated air through the chamber in order to dry moisture-laden articles positioned therein. Typically, an air handler or blower is used to urge the flow of heated air from chamber, through a trap duct, and to the exhaust duct where it is exhausted from the dryer appliance.

Conventional dryer appliances generate static electricity as water retained in fabrics or clothes is evaporated due to heat within the drum. Specifically, an electrostatic charge builds up on clothes when pieces of fabric or other clothing rub against each other. Such a charge build up is particularly noticeable when the humidity is low, so the dryness level at the end of a drying cycle is an important factor in the generation of static electricity. It is typically desirable to reduce static electricity in a dryer appliance, which may cause consumer dissatisfaction, e.g., due to electrical discharge, crackling, popping, or clinging clothes. These problems are exacerbated when synthetic, casual, or delicate loads are subjected to the drying process. Certain conventional dryer appliances include features or systems for reducing static electricity, but such systems are often complex, costly, and largely ineffective. In addition, such systems typically extend cycle times for the dryer appliance. Moreover, such systems can result in clothing that is wetter than desired at the conclusion of a drying cycle.

Accordingly, a laundry treatment appliance that obviates one or more of the above-mentioned drawbacks would be beneficial. In particular, a laundry treatment appliance that ensures a desired dryness level is reached with reduced static would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a laundry treatment appliance is provided. The method may include determining a target moisture level of the laundry load; initiating a drying cycle of the laundry load, the drying cycle including a primary drying time; initiating a spray operation for providing moisture into the chamber; determining that a measured moisture level of the laundry load meets a moisture goal based on the target moisture level; and ceasing the spray operation in response to determining that the measured moisture level meets the moisture goal.

In another exemplary aspect of the present disclosure, a laundry treatment appliance is provided. The laundry treatment appliance may include a cabinet; a drum rotatably mounted within the cabinet, the drum defining a chamber to selectively receive a laundry load; a moisture sensor provided within the chamber to sense a moisture level of the laundry load; a moisture supply in fluid communication with the chamber to selectively providing moisture into the chamber; and a controller operably connected with the moisture sensor and the moisture supply. The controller may be configured for determining a target moisture level of the laundry load; initiating a drying cycle of the laundry load, the drying cycle including a primary drying time; initiating a spray operation for providing moisture into the chamber; determining that a measured moisture level of the laundry load meets a moisture goal based on the target moisture level; and ceasing the spray operation in response to determining that the measured moisture level meets the moisture goal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 provides a method of operating a dryer appliance to reduce the buildup of static electricity according to an exemplary embodiment.

Figure 1:
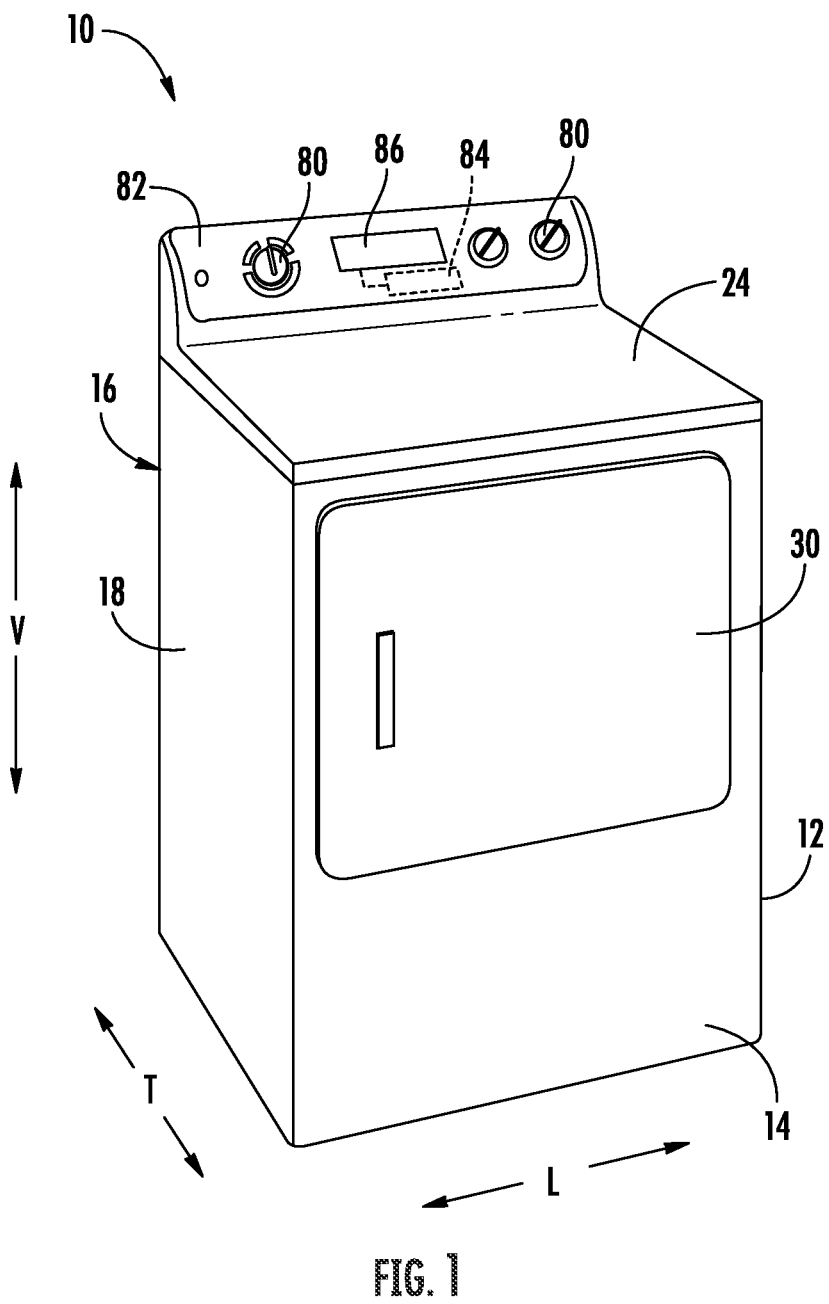
FIG. 1 provides a perspective view of a dryer appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
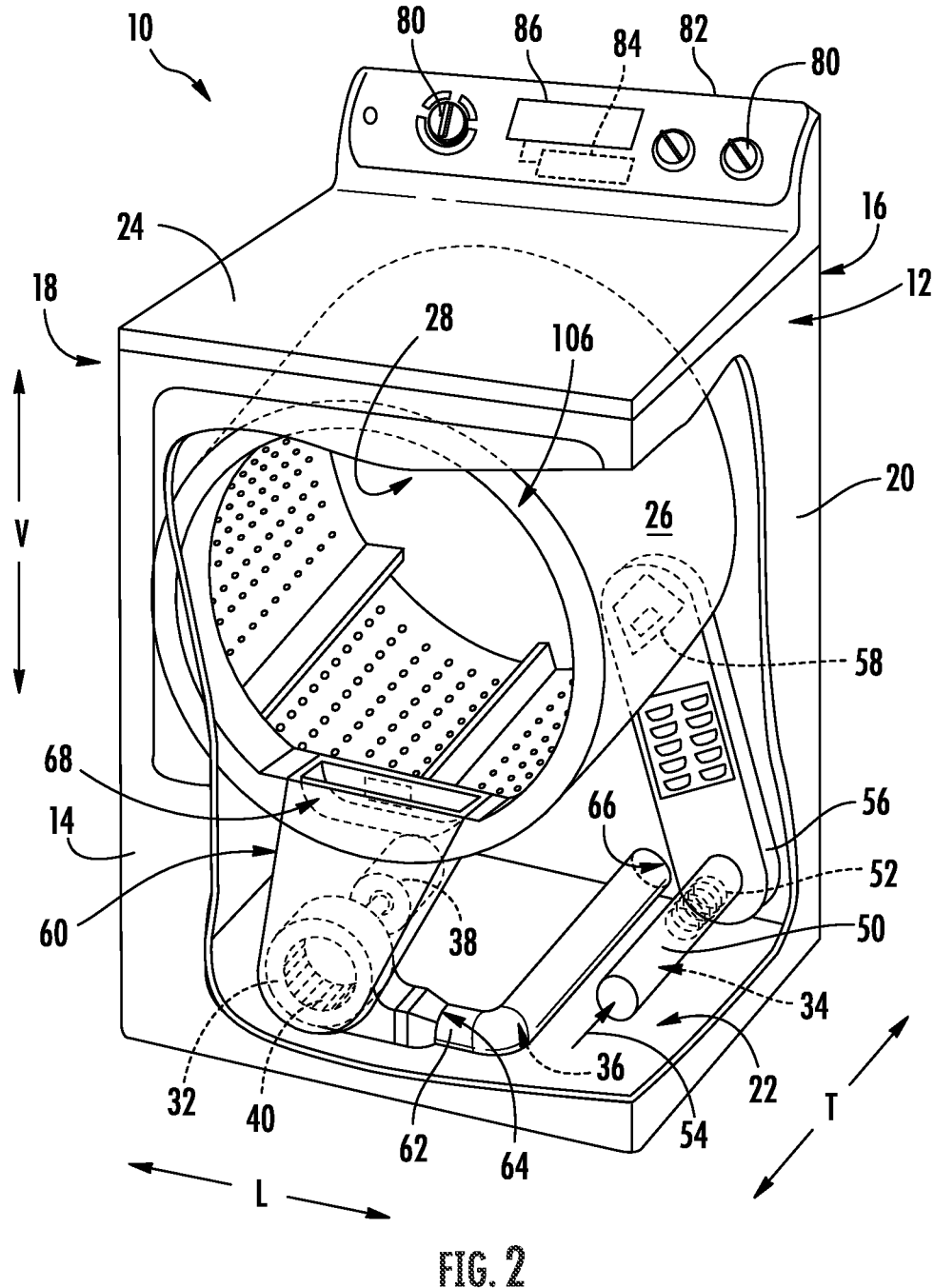
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14, a rear panel 16, a pair of side panels 18 and 20 spaced apart from each other by front and rear panels 14 and 16, a bottom panel 22, and a top cover 24. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. A door 30 is rotatably mounted to cabinet 12 for providing selective access to drum 26.

An air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters an air entrance passage defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including inlet duct 56, to drum 26. The heated air enters drum 26 through an outlet 58 of inlet duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a dry cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a dry cycle, internal air may thus flow from exhaust conduit 62 and through the external duct before being exhausted to the outdoor environment.

In exemplary embodiments, trap duct 60 may include a filter portion 68 which includes a screen filter or other suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30. The filter portion 68 may further be removable such that a user may collect and dispose of collected lint between drying cycles.

One or more selector inputs 80, such as knobs, buttons, touchscreen interfaces, etc., may be provided on a cabinet backsplash 82 and may be in communication with a processing device or controller 84. Signals generated in controller 84 operate motor 38, heating assembly 50, and other system components in response to the position of selector inputs 80. Additionally, a display 86, such as an indicator light or a screen, may be provided on cabinet backsplash 82. Display 86 may be in communication with controller 84 and may display information in response to signals from controller 84.

As used herein, "processing device" or "controller" may refer to one or more microprocessors or semiconductor devices and is not restricted necessarily to a single element. The processing device can be programmed to operate dryer appliance 10. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations. For certain embodiments, the instructions include a software package configured to operate appliance 10 and execute certain cycles or operating modes.

In some embodiments, dryer appliance 10 also includes one or more sensors that may be used to facilitate improved operation of dryer appliance. For example, dryer appliance 10 may include one or more temperature sensors which are generally operable to measure internal temperatures in dryer appliance 10 and/or one or more airflow sensors which are generally operable to detect the velocity of air (e.g., as an air flow rate in meters per second, or as a volumetric velocity in cubic meters per second) as it flows through the appliance 10. In some embodiments, controller 84 is configured to vary operation of heating assembly 50 based on one or more temperatures detected by the temperature sensors or air flow measurements from the airflow sensors.

Figure 3:
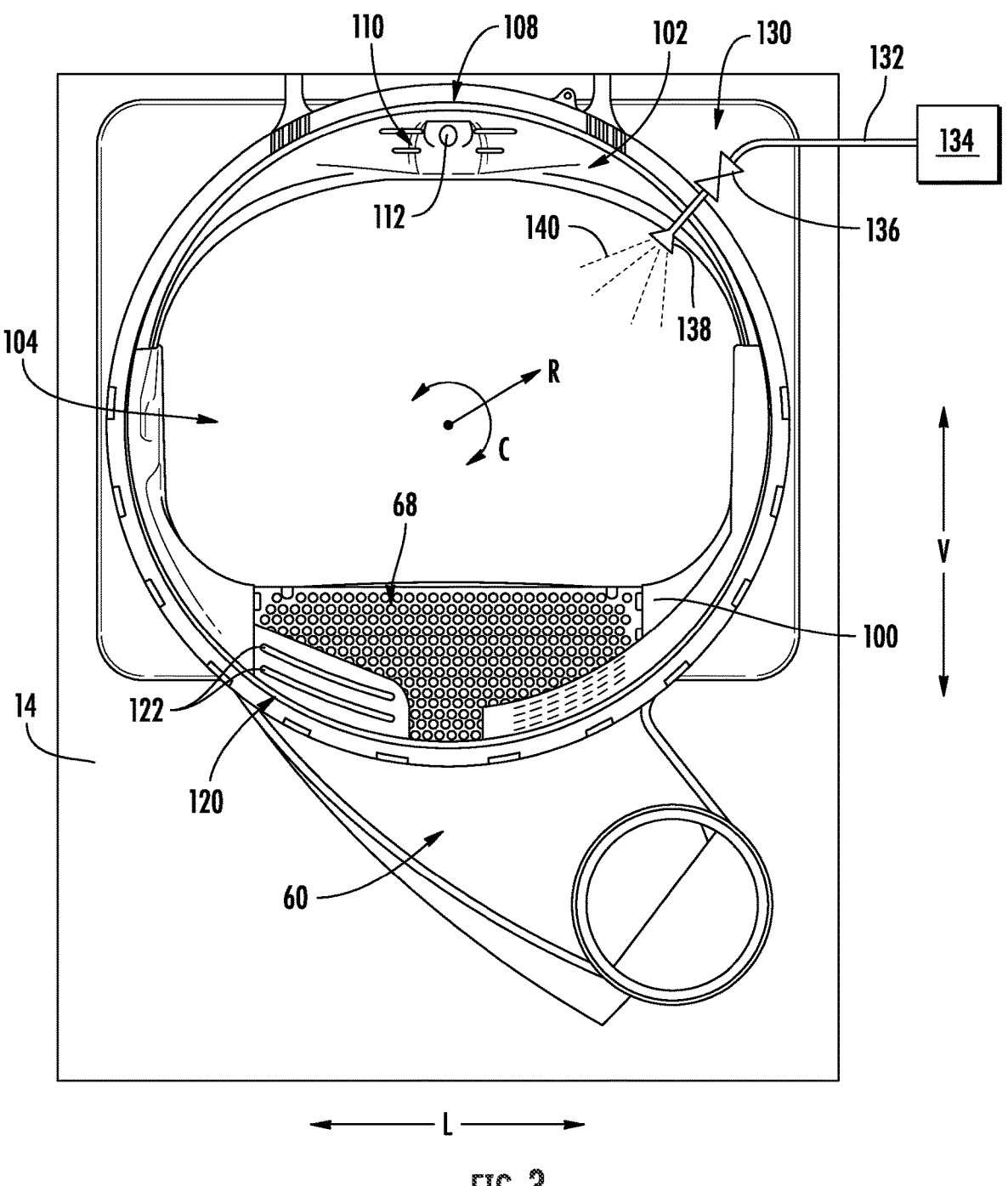
FIG. 3 provides a rear view of a top bearing of the exemplary dryer appliance of FIG. 1 according to an exemplary embodiment of the present subject matter.

Referring now generally to FIG. 3, dryer appliance 10 may include a front bulkhead 100 and a top bearing 102 mounted to front panel 14. Specifically, for example, front bulkhead 100 may be mounted directly to a backside of front panel 14 and may define an opening 104 through which chamber 28 may be accessed. Front bulkhead 100 may generally define a front end of chamber 28. In addition, front bulkhead 100 may house or support various components of dryer appliance, such as trap duct 60, filter portion 68, sensors, or other dryer components.

Top bearing 102 may be mounted directly to front bulkhead 102 and may be generally configured for supporting drum 26 as it rotates and housing various other dryer components. In this regard, top bearing 102 is generally positioned at a front of drum 26 and cabinet 12, e.g., proximate a front lip 106 (see FIG. 2) of drum 26. Top bearing 102 defines an outer surface 108 on which drum 26 may rotate. As best shown in FIG. 3, top bearing 102 may define a bulb housing 110 for receiving a light bulb 112 for illuminating chamber 28 when desired. The electronics (not shown) for powering light bulb 112 may be housed behind the top bearing 102, e.g., within a cavity and may be operably coupled with controller 84 which may regulate operation of light bulb 112. According to exemplary embodiments, top bearing 102 may also house other sensors, such as temperature and/or humidity sensors, or other dryer components.

For example, referring still to FIG. 3, dryer appliance may include a moisture sensor 120 that is generally configured for detecting or monitoring a moisture content or dampness of a load of clothes within chamber 28 during operation of dryer appliance 10. According to the illustrated embodiment, moisture sensor 120 comprises two sensor rods 122 that are spaced apart from each other on front bulkhead 100 such that clothes within chamber 28 tumble across the sensor rods 122 during the drying process. In this manner, clothing within chamber 28 may bridge the first and second sensor rods 122 in order to close a circuit coupled to first and second sensor rods 122. Sensor rods 122 may measure a moisture content of the clothing with moisture sensor 120, e.g., by monitoring voltages associated with dampness or moisture content within the clothing. In addition, or alternatively, moisture sensor 120 may measure the resistance between sensor rods 122 or the conduction of electric current through the clothes contacting sensor rods 122.

According to the illustrated embodiment, moisture sensor 120 includes two sensor rods 122 mounted on front bulkhead 100. However, it should be appreciated that according to alternative embodiments, moisture sensor 120 may be any other suitable type of sensor positioned at any other suitable location and having any other suitable configuration for detecting moisture content within a load of clothes. Moisture sensor 120 may generally be in communication with controller 84 and may transmit readings to controller 84 as required or desired. As explained in more detail below, dryer appliance 10 can monitor chamber humidity and/or the remaining moisture content of the clothes (e.g., to determine when a drying cycle should end).

According to exemplary embodiments, and as best illustrated schematically in FIG. 3, dryer appliance may further include a water supply 130 for selectively providing water into chamber 28, e.g., to facilitate the reduction of static electricity. In this regard, as illustrated, water supply 130 includes a water supply conduit 132 fluidly coupled to a water source 134 (e.g., such as a municipal water supply). A water valve 136 is operably coupled to water supply conduit 132 for regulating the flow of water therethrough. Water supply 130 may further include a nozzle 138, such as a misting nozzle, that is fluid coupled to the water supply conduit 132 and is positioned for discharging the flow of water into chamber 28. Specifically, according to an exemplary embodiment, nozzle 138 is configured for receiving the flow of water and generating a fine mist (indicated by reference numeral 140 in FIG. 3) that is dispersed throughout chamber 28. It should be appreciated that according to alternative embodiments, dryer appliance 10 may include any other suitable number, type, position, and configuration of water supply nozzles, conduits, or subsystems.

Now that the construction of dryer appliance 10 and the configuration of controller 84 according to exemplary embodiments have been presented, an exemplary method 300 of operating a dryer appliance will be described. Although the discussion below refers to the exemplary method 300 of operating dryer appliance 10, one skilled in the art will appreciate that the exemplary method 300 is applicable to the operation of a variety of other dryer appliances or other suitable appliances. In exemplary embodiments, the various method steps as disclosed herein may be performed by controller 84 or a separate, dedicated controller.

Referring to FIG. 4, at step 302, method 300 may include determining a target moisture level of a laundry load. The target moisture level maybe based at least in part on a selected dryness level. In detail, when selecting a drying operation (e.g., via a user interface of the dryer appliance, via a wirelessly connected device, etc.), a user may opt for a sensor based drying option (e.g., utilizing moisture sensor 122). The sensor based drying option may include a selected dryness level (e.g., very dry, dry, less dry, etc.). The selected dryness level may correspond to a specific moisture level of the laundry load upon completion (e.g., according to a moisture voltage as described above). For one example, a dryness level of very dry corresponds to a moisture level of between about 0% and about 5%. It should be understood that examples of moisture levels given herein are by way of example only.

The target moisture level may be relative to a conclusion of the drying cycle. In detail, the drying cycle may include a primary drying time. The primary drying time may be indicative of a length of time required to reach the target moisture level of the laundry load. For instance, the primary drying time may not take into account one or more additional features applicable to the drying operation (e.g., a reduced-static feature, a moisture injection feature, etc.). Thus, the target moisture level of the laundry load corresponds to a completion of the primary drying time.

At step 304, method 300 may include initiating the drying cycle of the laundry load. As mentioned above, the drying cycle may include the primary drying time. The primary drying time may be calculated according to a plurality of factors related to the laundry load. For instance, the plurality of factors may include the selected dryness level, the size (e.g., weight) of the laundry load, a cycle attribute selection (e.g., delicates, towels, water-shedding, etc.), flow restrictions within an air circulation assembly, or the like. Thus, the drying cycle may be performed as the dryness (or moisture level) of the laundry load is monitored (e.g., via the moisture sensor or humidity sensor). Additionally or alternatively, when selecting options for drying, the additional features may be selected by the user. For one example, upon selecting a sensor dry drying cycle with a desired dryness level, a reduced-static feature is selected as well. According to some embodiments, the reduced-static feature is selected automatically when any sensor dry drying cycle is selected.

At step 306, method 300 may include initiating a spray operation for providing moisture into the chamber. In detail, after the drying cycle has been performed such that the target moisture level has been reached (or the primary drying time has been reached following 304), the spray operation may be performed within the chamber (e.g., chamber 28). The spray operation may be performed by a water supply (e.g., water supply 130). As described briefly above, the spray operation may include a plurality of pulse periods of activating the water supply and dispensing moisture (e.g., water spray) into the chamber via a nozzle. Each of the plurality of pulse periods may include an ON time of the nozzle in which water is sprayed and an OFF time of the nozzle in which spray is halted. Accordingly, moisture may be periodically supplied into the chamber to selectively reduce static electricity within the laundry load.

Upon initiating the spray operation, a moisture goal may be determined (e.g., within a controller of the appliance). For instance, the moisture goal may be determined according to the selected drying level of the drying cycle. Additionally or alternatively, the moisture goal may depend on the load size (e.g., weight) of the laundry load. For example, the moisture goal for a relatively small load can be between about 80% and about 90% of the target moisture level. Accordingly, the moisture goal may be based on (e.g., as a function or set percentage of) the target moisture level, taking into consideration the size (e.g., weight) of the laundry load.

In response to determining the moisture goal, an additional amount of drying time may be determined. For instance, the additional amount of drying time may be determined or retrieved from a look-up table (e.g., as gleaned from empirical data). Additionally or alternatively, the additional amount of drying time may be determined according to a predetermined function or algorithm, as an indexed interval, or the like. The additional amount of drying time may be added to the primary drying time. For instance, upon completing the primary drying time and initiating the spray operation, the additional drying time may be added to the drying cycle to ensure complete and adequate drying of the laundry load provided in the chamber. The additional drying time may incorporate a length of time to perform the spray operation. For instance, the additional drying time may incorporate a number or amount of pulse periods for which to dispense moisture into the chamber. Additionally or alternatively, the additional drying time may include time after the spray operation is completed.

At step 308, method 300 may include determining that a measured moisture level of the laundry load meets the moisture goal based on the target moisture level. As mentioned above, the moisture goal may be based at least in part on a size of the laundry load (e.g., together with the selected dryness level). The additional drying time may be incorporated upon the initiation of the spray operation. As the drying cycle continues together with the spray operation, the moisture level of the laundry load may be continually monitored (e.g., by the moisture sensor). The controller may determine that the moisture goal is reached after a predetermined amount of time of performing the spray operation. For instance, empirical data related to load sizes, perceived dryness levels, lengths of spray operations, and additional factors related to the drying cycle may be incorporated into an algorithm. The algorithm may thus determine the additional drying time according to each aspect of the drying cycle, including a length of time of the spray operation. Additionally or alternatively, the moisture sensor may determine in real time when the moisture goal is reached while performing the spray operation. For instance, a sensor voltage may be obtained by the moisture sensor while the spray operation is performed. When the sensor voltage has reached a target voltage corresponding to the moisture goal, the controller may determine that the moisture goal has been reached.

At step 310, method 300 may include ceasing the spray operation in response to determining that the measured moisture level meets the moisture goal. In detail, upon performing the spray operation until the moisture goal is reached, the controller may cease the spray operation while continuing to perform the remaining additional drying time. Advantageously, the laundry load may continue drying after the moisture has been added to the chamber to ensure the desired dryness level is reached before the end of the drying cycle. As mentioned above, the additional drying time may include at least a portion of drying time performed after ceasing the spray operation.

Figure 5:
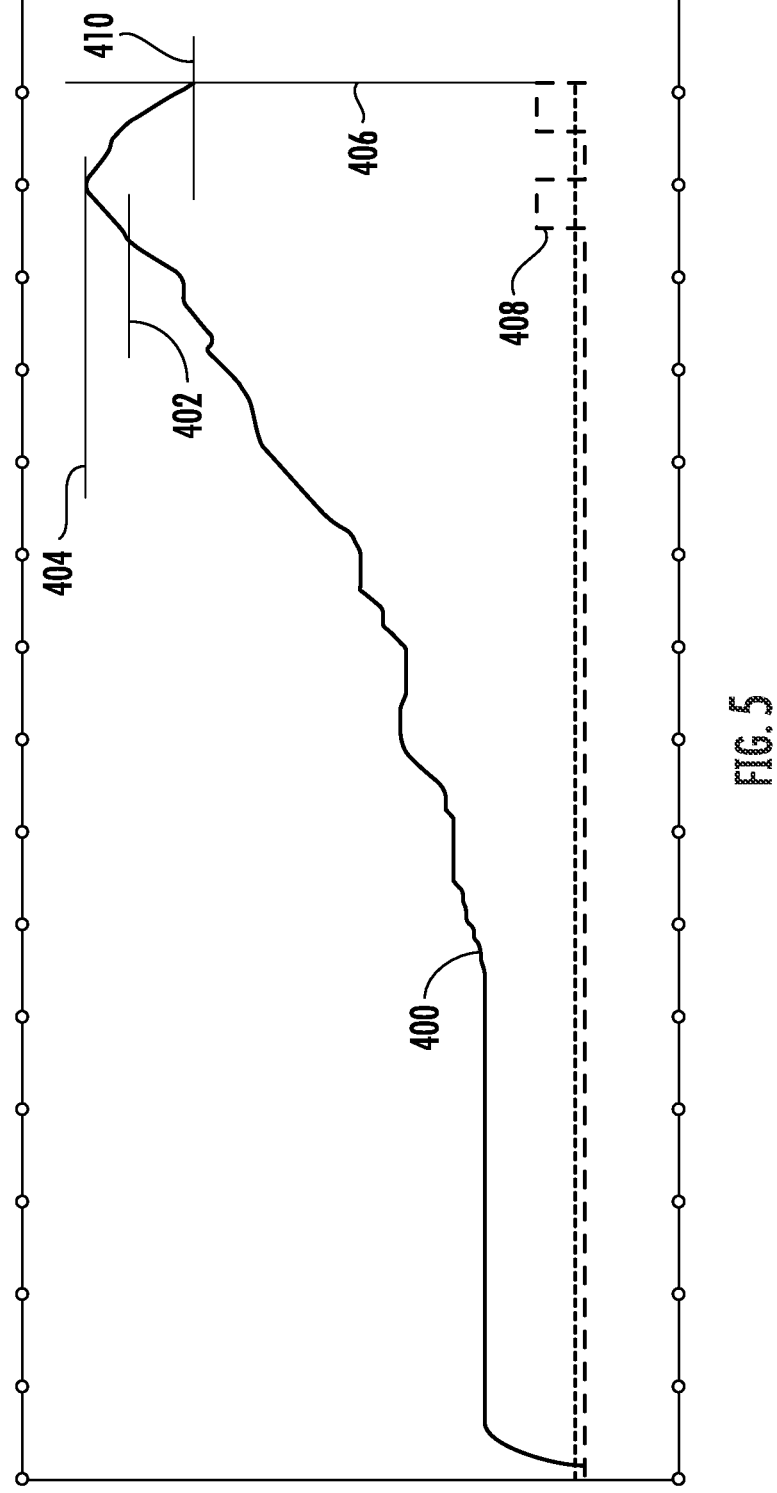
FIG. 5 is a plot of a voltage measured by a moisture sensor along the total pulse period of a water supply during a drying cycle according to an exemplary embodiment.

Referring to FIG. 5, an exemplary graph of a moisture level of a laundry load (e.g., expressed as a measured sensor voltage 400) together with pulses of the spray operation 408 are provided. As seen in FIG. 5 and according to an example, a user selects a "Less Dry" option while choosing a sensor dry drying cycle on an appliance. The "Less Dry" option may be associated with a first sensor voltage (e.g., the target moisture level 402), which in turn may be a predetermined percentage of a maximum sensor voltage 404 (e.g., an instance of perfectly dry clothes). According to the example shown in FIG. 5, when the sensor voltage 400 reaches the target moisture level 402, the spray operation 408 is initiated (e.g., as the plurality of spray pulses). The drying cycle may continue with the spray operation 408 according to the determined additional drying time. When the sensor voltage 400 reaches a second sensor voltage (e.g., the moisture goal 410), the spray operation may be ceased. For example, the moisture goal 410 is associated with a time 406 to cease the spray operation and continue the drying cycle. The additional drying time may continue after the spray operation is ceased to ensure the laundry load reaches the desired dryness level.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a laundry treatment appliance, the laundry treatment appliance comprising a chamber for receiving a laundry load and a water supply provided within the chamber and a moisture sensor provided within the chamber, the method comprising:
   determining a target moisture level of the laundry load;
   initiating a drying cycle of the laundry load, the drying cycle comprising a primary drying time;
   initiating a spray operation for providing moisture into the chamber;
   determining that a measured moisture level of the laundry load meets a moisture goal based on the target moisture level; and
   ceasing the spray operation in response to determining that the measured moisture level meets the moisture goal.

2. The method of claim 1, wherein the spray operation comprises a plurality of pulse periods, each of the plurality of pulse periods having an ON time followed by an OFF time of a spray of moisture.

3. The method of claim 1, wherein the moisture sensor is one of a moisture sensor bar for sensing moisture within the laundry load or a humidity sensor for sensing a relative humidity of air within the chamber.

4. The method of claim 3, wherein determining that the measured moisture level of the laundry load meets the moisture goal comprises:
   obtaining a sensor voltage measured by the moisture sensor; and
   determining that the sensor voltage has reached a target voltage corresponding to the moisture goal.

5. The method of claim 1, wherein the moisture goal is determined according to a selected dryness level.

6. The method of claim 5, wherein the selected dryness level is a user selected dryness level selected by a user via the laundry treatment appliance.

7. The method of claim 1, further comprising:
   determining an additional amount of drying time, the additional amount of drying time being added to the primary drying time; and
   executing the additional amount of drying time after ceasing the spray operation.

8. The method of claim 7, wherein determining the additional amount of drying time comprises:
   determining a size of the laundry load; and
   analyzing a selected dryness level.

9. A laundry treatment appliance comprising:
   a cabinet;
   a drum rotatably mounted within the cabinet, the drum defining a chamber to selectively receive a laundry load;
   a moisture sensor provided within the chamber to sense a moisture level of the laundry load;
   a moisture supply in fluid communication with the chamber to selectively providing moisture into the chamber; and
   a controller operably connected with the moisture sensor and the moisture supply, the controller being configured for:
      determining a target moisture level of the laundry load;
      initiating a drying cycle of the laundry load, the drying cycle comprising a primary drying time;
      initiating a spray operation for providing moisture into the chamber;
      determining that a measured moisture level of the laundry load meets a moisture goal based on the target moisture level; and
      ceasing the spray operation in response to determining that the measured moisture level meets the moisture goal.

10. The laundry treatment appliance of claim 9, wherein the spray operation comprises a plurality of pulse periods, each of the plurality of pulse periods having an ON time followed by an OFF time of a spray of moisture.

11. The laundry treatment appliance of claim 9, wherein the moisture sensor is one of a moisture sensor bar for sensing moisture within the laundry load or a humidity sensor for sensing a relative humidity of air within the chamber.

12. The laundry treatment appliance of claim 11, wherein determining that the measured moisture level of the laundry load meets the moisture goal comprises:
   obtaining a sensor voltage measured by the moisture sensor; and
   determining that the sensor voltage has reached a target voltage corresponding to the moisture goal.

13. The laundry treatment appliance of claim 9, wherein the moisture goal is determined according to a selected dryness level.

14. The laundry treatment appliance of claim 13, wherein the selected dryness level is a user selected dryness level selected by a user via the laundry treatment appliance.

15. The laundry treatment appliance of claim 9, wherein the controller is further configured for:

determining an additional amount of drying time, the additional amount of drying time being added to the primary drying time; and executing the additional amount of drying time after ceasing the spray operation.

16. The laundry treatment appliance of claim 15, wherein determining the additional amount of drying time comprises:

determining a size of the laundry load; and analyzing a selected dryness level.

\* \* \* \* \*